United States Patent
Wu

(10) Patent No.: US 7,995,628 B2
(45) Date of Patent: Aug. 9, 2011

(54) RECYCLING PUMP-BEAM METHOD AND SYSTEM FOR A HIGH-POWER TERAHERTZ PARAMETRIC SOURCE

(75) Inventor: Dong Ho Wu, Olney, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/710,521

(22) Filed: Feb. 23, 2010

(65) Prior Publication Data

US 2010/0290487 A1 Nov. 18, 2010

Related U.S. Application Data

(60) Provisional application No. 61/154,819, filed on Feb. 24, 2009.

(51) Int. Cl.
*H01S 3/10* (2006.01)
(52) U.S. Cl. ............................................ 372/21; 372/22
(58) Field of Classification Search .................. 372/20, 372/21, 22, 28, 29.021, 32
See application file for complete search history.

(56) References Cited

OTHER PUBLICATIONS

Wu, Dong Ho, et al., Electro-optically tunable compact terahertz source (slides), American Physical Society, Mar. 15, 2006, pp. 1-18.*
Nd: YAG laser, Wikipedia the free encyclopedia, Internet [Accessed Jan. 18, 2010], pp. 1-5.
Garzarella, Anthony et al. Responsivity optimizatin and stabilizatin in electro-optic field sensors, Applied Optics, Sep. 10, 2007, pp. 6636-6640, vol. 46, No. 26, Optical Society of America, USA.

* cited by examiner

*Primary Examiner* — Armando Rodriguez
(74) *Attorney, Agent, or Firm* — Amy L. Ressing; John Leonard Young

(57) ABSTRACT

A method and a system are implemented in the fabrication of a portable high power terahertz beam source that can produce a tunable, high power terahertz beam over the frequency from 0.1 THz to 2.5 THz. The terahertz source employs a recycling pump beam method and a beam quality control device. The beam quality control device may or may not be required for a high power terahertz beam generation. In exemplary embodiments, a lithium niobate ($LiNbO_3$) crystal or a lithium niobate crystal doped with 5% magnesium oxide ($LiNbO_3$:MgO) can be used. Other nonlinear optical crystals, including GaSe can be used in place of the $LiNbO_3$ crystal. Through proper alignment of a pump beam, along with recycling a pump beam, high conversion efficiency is achieved, and a high output power beam is produced at terahertz frequencies.

14 Claims, 10 Drawing Sheets

Lithium niobate crystal structure and the optical axes (a-axes and c-axis)

RECYCLING PUMP-BEAM METHOD AND SYSTEM FOR A HIGH-POWER TERAHERTZ PARAMETRIC SOURCE

FIELD OF THE INVENTION

The present invention relates to terahertz beam generation. More particularly, the present invention involves improvements in the techniques of parametric terahertz-beam generation for use in applications of terahertz technology, including the detection of hidden weapons, explosives, biochemical agents, and nuclear materials.

BACKGROUND OF THE INVENTION

In 1971 a research group at Stanford University made the first demonstration of a terahertz source, based on the optical parametric technique. Since then, other groups have contributed to the improvement of the optical, parametric terahertz-beam generation. While this research has clearly improved the properties of nonlinear optical materials, used in terahertz parametric sources, only marginal progress has been made on the technique itself of parametric terahertz-beam generation.

The parametric generation of sub-harmonic frequency signals can be achieved, if the following two conditions are satisfied:

$$\omega_3 = \omega_1 - \omega_2 \quad (1); \text{ and}$$

$$k_3 = k_1 - k_2. \quad (2)$$

Here, $\omega_1$, $\omega_2$ and $\omega_3$ are the frequencies of the pump beam, the idler beam and the signal beam, respectively; and $k_1$, $k_2$ and $k_3$ are the wave vectors of the pump beam, the idler beam and the signal beam, respectively. The idler beam is produced by the Raman process, which occurs inside a nonlinear crystal, when the pump beam interacts with the nonlinear crystal. The first equation shows the frequency matching condition (see FIG. 1), which corresponds to energy conservation, and the second equation shows the phase matching condition, which corresponds to momentum conservation.

When a high-frequency electromagnetic beam (e.g., an infrared or visible light beam) traverses a medium and/or the nonlinear optical crystal, the high frequency beam experiences the phenomenon of dispersion. As a result, the refractive index n, which is frequency dependent within the medium and/or crystal, and the wave vector $k = n(\omega)\,\omega/c$ (3) would not necessarily change linearly with the frequency $\omega$. For this reason, in general, it is not possible to satisfy both the frequency matching and the phase matching conditions within a crystal. This difficulty can be overcome by exploiting the birefringence in an anisotropic crystal, so that both the frequency matching condition and the phase matching condition can be achieved. Birefringence implies that there are two different refractive indices, $n^{(e)}$ and $n^{(o)}$, where $n^{(e)}$ denotes the refractive index along the extraordinary optical axis, and $n^{(o)}$ denotes the refractive index along the ordinary axis. Because the wave vectors are related to the refractive indices by $k = n(\omega)\,\omega/c$, there are two wave vectors, $k^{(e)}$ and $k^{(o)}$, along the extraordinary and ordinary axes. Also, because the values of $k^{(e)}$ and $k^{(o)}$ are usually different, as well as dependent on the angle of incidence of the pump beam 102 (see FIG. 1), the phase matching condition illustrated in FIG. 1 can be achieved, either by type I phase matching or by type II phase matching.

Type I phase matching: $k_1^{(e)} = k_2^{(o)} + k_3^{(o)}$; and (4)

Type II phase matching: $k_1^{(e)} = k_2^{(e)} + k_3^{(o)}$ or $k_1^{(e)} = k_2^{(o)} + k_3^{(e)}$. (5)

FIG. 1 shows a diagram of Type I phase matching, in which the birefringence of a nonlinear crystal is used to compensate for the dispersion in the material.

This technique is widely used in optical parametric beam generation. For terahertz beam generation the same technique can be employed, and two different types of terahertz sources have been developed. These two different types of parametric terahertz sources that have been developed are (1) the terahertz parametric generator (TPG) and (2) the terahertz parametric oscillator (TPO). The structure of the TPG is similar to that of the TPO, except that the TPG has no resonating cavity for idler beam 104 oscillation (see the front and back at least a group of two high-reflection and/or high reflectivity (HR) mirror(s) 302 illustrated in FIG. 3A; these HR mirror(s) 302 make the idler beam 104 resonate between the mirrors).

FIG. 2 illustrates a schematic diagram of a terahertz parametric generator 200 (TPG). The pulsed laser stages in this embodiment can include a neodymium-doped yttrium aluminium garnet Nd:YAG; (Nd:$Y_3Al_5O_{12}$) pulsed laser stage and/or a pulsed laser source (hereafter referred to as the "Nd:YAG pulsed laser 202"), which includes a crystal that is used as a lasing medium for solid-state lasers. The frequency of the terahertz beam is tuned by changing an angle phi 103 ($\phi$) between the optical axis 204 of the nonlinear optical crystal 214 and the pump beam 102, which can be accomplished by rotating, mechanically, manually and/or electrically, the optical axis 204 by a rotation stage 212 mounted with the nonlinear optical crystal 214 aligning the pump beam 102.

According to exemplary embodiments, the Nd:YAG pulsed laser 202 disclosed herein can have a wavelength lambda ($\lambda$) equal to 1064.7 nanometers (nm).

According to exemplary embodiments, the pulsed energy of the Nd:YAG pulsed laser 202 should be more than 16 millijoules (mJ) associated with the production of a terahertz beam.

According to exemplary embodiments, the pulse width of the Nd:YAG pulsed laser 202 can be between a range of about 17.3 to about 24 nanoseconds (ns); and the repetition rate can be about 20-100 Hertz (Hz) or higher.

Further according to exemplary embodiments, the idler beam 104 can have a wavelength lambda of between about 1065 to about 1075 nm.

According to exemplary embodiments, the pump beam 102 can have a wavelength lambda of about 1064.7 nm.

Additionally, in exemplary embodiments, the length of the nonlinear optical crystal 214 is typically about 65 millimeters (mm).

FIG. 3A illustrates a schematic diagram of a terahertz parametric oscillator 300 (TPO).

Again referring to FIG. 3A, and in regard to the TPO, the idler beam 104 resonates between the HR mirror(s) 302 to increase its amplitude. The pump beam 102 is used once and then dumped into the beam dump 210, both in the TPG and the TPO. The pump beam 102, which is dumped in the beam dump 210, still has substantial laser energy; hence the energy efficiency of the TPG and the TPO techniques is low. In fact the energy conversion efficiency (wherein the energy conversion efficiency is defined as the ratio of the pump beam energy to the terahertz beam energy) of these techniques is below $10^{-5}$.

Referring to FIG. 3A, the repetition rate of Nd:YAG pulsed laser 202 is very slow (see the bottom panel in FIG. 3A), making the averaged terahertz output power low.

Additionally, when the power density of the Nd:YAG pulsed laser 202 exceeds $1.2 \times 10^8$ W/cm$^2$, the pump beam 102 can damage the nonlinear optical crystal 214. Therefore, the intensity of the pump beam 102 should be limited to be below a certain value (i.e., a power density of about $1.2 \times 10^8$ W/cm² for the exemplary embodiments) to prevent damage to the nonlinear optical crystal 214.

Due to this limitation on the pump power and also due to the slow repetition rate of pulses of the pump beam 102, the averaged output power of either the TPG and/or the TPO illustrated in FIG. 2 and FIG. 3A respectively is very low (typically below 100 µW).

Referring to FIG. 3A again, and the terahertz parametric oscillator 300, the pair of high-reflection (HR) mirror(s) 302 (hereafter referred to as the "HR mirror(s) 302") make the idler beam 104 resonate between the minors. Similar to the terahertz parametric generator, the terahertz frequency is tuned by rotating the nonlinear optical crystal 214 (i.e., changing the angle phi 103 (ϕ) between the optical axis 204 of the nonlinear optical crystal 214 and the pump beam 102).

New applications of terahertz technology have been theorized and experimentally demonstrated in the laboratory environments, including the detection of hidden weapons, explosives, biochemical agents, and nuclear materials.

Practical implementations of these new applications, have not been possible until the development of the exemplary embodiments, because conventional terahertz sources are limited to low output power and because current terahertz detectors have low sensitivities. Free electron lasers have tunable capabilities and they can produce high power terahertz beams ranging from about 100 watts to about a few kilowatts; but, free electron lasers work in a manner different than the exemplary embodiments and free electron lasers are too bulky and too heavy to be useful in the field. Thus, there are no known portable, tunable, high-output-power, terahertz beam sources comparable to the exemplary embodiments disclosed herein.

Therefore, the need exists for portable, high-power terahertz-beam sources which are tunable and have high efficiency.

SUMMARY OF THE INVENTION

A recycling pump-beam method has been implemented through the fabrication of a portable, high-power terahertz-beam source, which produces a tunable terahertz beam over a frequency range from 0.1-2.5 THz. (See FIG. 5A.) Exemplary embodiments of these sources comprise a nonlinear optical crystal 214 including a lithium niobate ($LiNbO_3$) crystal or a lithium niobate crystal, doped with 5% magnesium oxide ($LiNbO_3$:MgO 5%). Other nonlinear optical crystal(s) 214, including gallium selenide crystals (GaSe), can be used in place of $LiNbO_3$. Through proper alignment of the pump beam 102, along with recycling of the pump beam 102, a high output power ($\geq 1$ mW) of terahertz beam has been achieved. Such a high output power of terahertz beam 208 is possible in part due to the increased repetition rate of pump beam 102 pulses, which include fresh pump beam pulses (that is pump beam 102 pulses that are freshly pumped) and the recycled beam pulses (such as the second pump beam 506 pulses) (see FIG. 5A and FIG. 5B). In addition to the high repetition rate the interaction between the fresh pump beam and the recycled pump beam results in an amplification effect, since the terahertz beam output increases as a hyperbolic function of the combined pump beam power. Because of the high repetition rate of pump beam pulses and the amplification effect the high conversion efficiency is achieved with the TPO for which the recycling of the pump beam is implemented. A beam shaping optics stage may be implemented for proper alignment of the phase and the polarization of the recycled pump beam. This beam shaping stage is required only if the phase and the polarization of the recycled pump beam are very different from those of the fresh pump beam. A nonlinear optical crystal stage having a nonlinear optical crystal is cooperatively coupled to the pulsed laser stage by the beam shaping optics stage, where the nonlinear optical crystal produces an idler beam and generates the output power beam produced at terahertz frequencies.

DETAILED DESCRIPTION OF THE INVENTION

Preferred exemplary embodiments of the present invention are now described with reference to the figures, in which like reference numbers are used to indicate identical or functionally similar elements. While specific details of the exemplary embodiments are discussed, it should be understood that this is done for illustrative purposes only. A person skilled in the relevant art will recognize that other configurations and arrangements can be used without departing from the spirit and scope of the exemplary embodiments. It will also be apparent to a person skilled in the relevant art that this invention can also be used in other applications. Furthermore, the terms "a", "an", "first", "second" and "third" etc., used herein, do not denote limitations of quantity, but rather denote the presence of one or more of the referenced items(s).

Referring to FIG. 1 through FIG. 8, in accordance with the exemplary embodiments, a method and system for a product by process are implemented in the fabrication of a portable high-power terahertz beam source, which can produce a tunable, high-power terahertz beam. The terahertz source employs a recycling pump-beam technique, which may or may not use a beam quality-control device, which is part of this invention disclosure. In exemplary embodiments, a lithium niobate (LiNbO$_3$) crystal or a lithium niobate crystal, doped with 5% magnesium oxide (LiNbO$_3$:MgO 5%), can be used. Other nonlinear optical crystals, including gallium selenide crystal (GaSe) can be used in place of the lithium niobate crystal.

Figure 4:
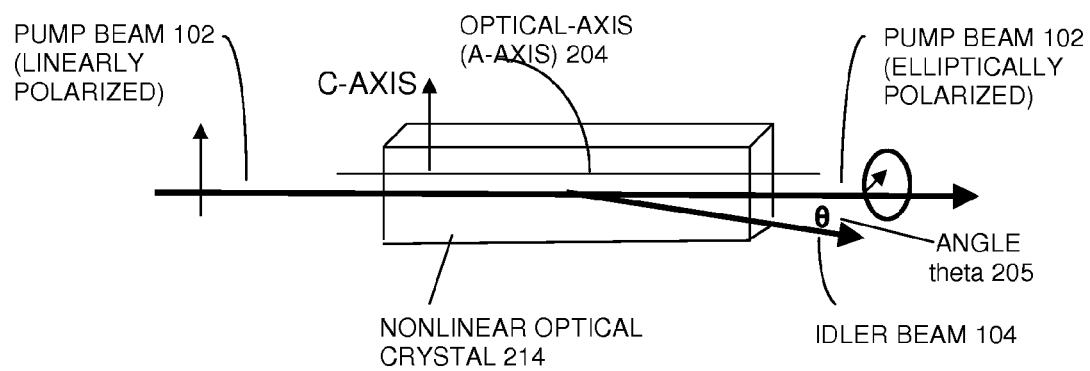
FIG. 4 illustrates generation of the idler beam 104 by the pump beam 102 and the polarization state of the pump beam 102 before and after traversing the nonlinear optical crystal 214.
Figure 5:
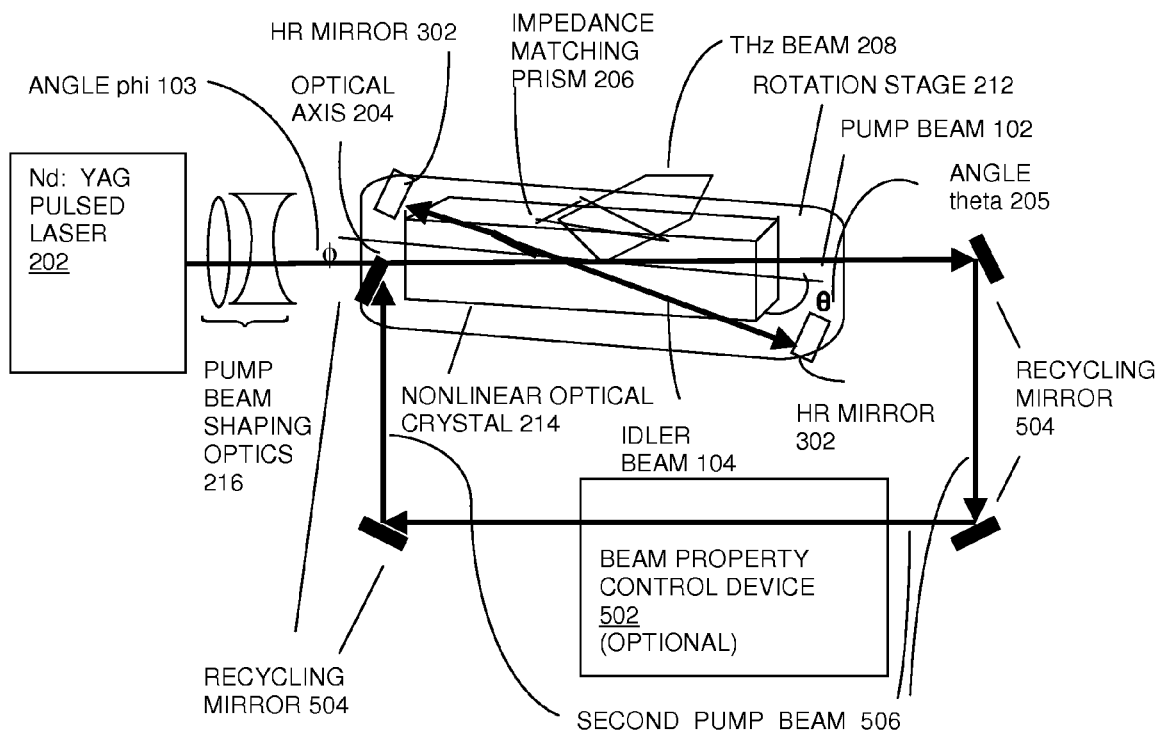
FIG. 5A illustrates an optical axis 204, and the configuration of a pump beam 102 and idler beam 104 in a terahertz parametric oscillation technique using a pump beam 102 recycled.
FIG. 5B illustrates a timing diagram of pump laser pulses comprising fresh pump beams combined with recycled beams, according to exemplary embodiments of the terahertz parametric oscillation technique illustrated in FIG. 5A.
Figure 5:
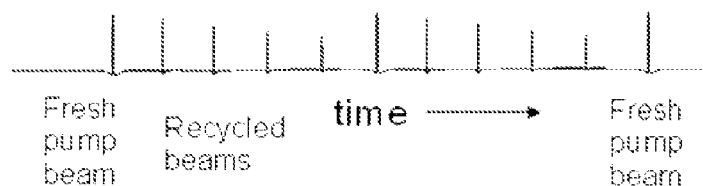
Figure 9:
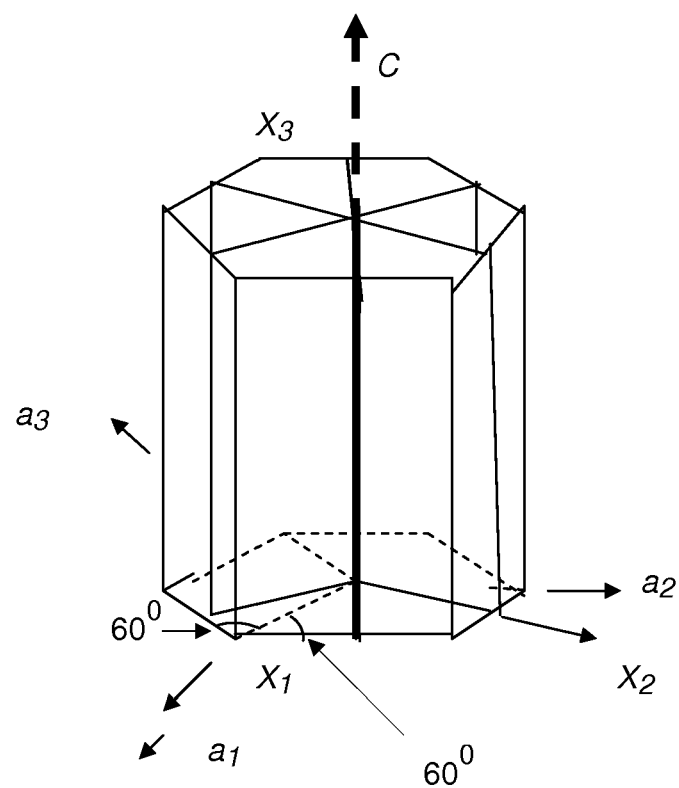
FIG. 9 illustrates the crystal structure of $LiNbO_3$ (a nonlinear crystal, such as the nonlinear optical crystal 214), and its optical axes.

According to exemplary embodiments, for parametric terahertz-beam generation methods and systems, a linearly polarized high-intensity laser beam is typically used, having a typical intensity equal to and/or greater than about 90 MW/cm$^2$. As shown in FIG. 4, polarization (i.e., linearly polarized) of the pump-beam 102 is aligned parallel to the C-axis 204c of the nonlinear optical crystal 214 (which can be a lithium niobate crystal with or without 5% MgO) (also see FIG. 6A and FIG. 6B which illustrate schemes of the recycling of the pump beam 102 in parallel beam and in crossed beam configurations). The optical axis 204 can be either an "$a_1$-axis" 204$a_1$; or an "$a_2$-axis" 204$a_2$; or an "$a_3$-axis" 204$a_3$ (see FIG. 9). The pump beam 102 in the TEM00 mode interacts with the nonlinear optical crystal 214 and generates an idler beam 104. The frequency of the idler beam 104 is slightly lower than the frequency of the pump beam 102, and the direction of idler beam emission is at an angle theta 205 (θ), which is a slight angle with respect to the pump beam, as shown in FIG. 4. In general, the pump beam 102 (in this case, the pumped beam 102 freshly pumped, also known as the first pump beam) that exits the nonlinear optical crystal 214 is elliptically polarized, and the direction of the major axis of the elliptical polarization often changes with time. (According to exemplary embodiments, elliptical polarization can be called a second polarization).

According to exemplary embodiments of the terahertz generator, the wavelength of the pump beam 102 is 1064.7 nm, which approximately corresponds to a frequency ($\omega_1$) of 281.77 THz. Further according to exemplary embodiments, the idler beam 104 can be tuned over the wavelength range from between about 1065.07 nm to about 1074.3 nm (the corresponding $\omega_2$ frequencies can be between about 281.67 THz and about 279.25 THz), as the angle phi 103 φ is changed (see FIG. 3A). The frequency difference between $\omega_1$ and $\omega_2$ is $\omega_3$ (=$\omega_1$−$\omega_2$), is within the frequency range of about 0.1-2.5 THz. FIG. 3B illustrates a timing diagram of pump laser pulses showing the occurrences of the introduction of fresh pump beams, associated with the terahertz parametric oscillator 300 (TPO) illustrated in FIG. 3A. Because experimental conditions may vary, the wavelengths and corresponding frequencies of the pump beam 102, the idler beam 104 and the signal beam (such as the terahertz beam 208 $\omega_3$) may fluctuate slightly. Thus, a terahertz parametric oscillator or a terahertz parametric generator (such as the terahertz parametric generator 200) can be constructed by using a pump laser (such as the Nd:YAG pulsed laser 202) employing different wavelengths other than 1064.7 nm. According to exemplary embodiments, the wavelength of the pump beam 102 can range from 780 nm, or 800 nm, or 1064 nm more or less, or any other value. The wavelength of the idler beam 104 changes when a different pump laser is used. Because the frequency of $\omega_3$ (i.e., the terahertz beam 208) is determined by the frequency difference between $\omega_1$ and $\omega_2$, the same terahertz frequency bandwidth can be obtained by adjusting the wavelengths of either the pump beam 102 ($\omega_1$) and the idler beam 104 ($\omega_2$).

FIG. 5A illustrates an exemplary embodiment of a terahertz parametric oscillator (TPO). FIG. 5B illustrates a timing diagram of pump laser pulses comprising fresh pump beams combined with recycled beams, according to exemplary embodiments of the terahertz parametric oscillation technique illustrated in FIG. 5A.

In contrast to the design illustrated in FIG. 3A, the pump beam 102 in FIG. 5A exits from the nonlinear optical crystal 214 and is not dumped in a beam dump 210, according to exemplary embodiments, the exiting beam from the nonlinear optical crystal 214 is recycled. As mentioned before, the pump beam 102 exiting the nonlinear optical crystal 214 is, in general, elliptically polarized, and the polarization direction can change slowly with time. Since it is desirable to have the pump beam 102 linearly polarized (according to exemplary embodiments, this is called a first polarization) and to align polarization of the pump beam 102 so that the polarization is parallel to the c-axis 204c of the nonlinear optical crystal 214, a polarization correction device (herein referred to as a "beam property control device 502") is inserted before recycling the pump beam 102 (see FIG. 5A). The beam property control device 502 converts the pump beam 102 which is elliptically polarized (i.e., the second polarization) into a pump beam 102 which is linearly polarized (i.e., the first polarization), and then rotates either mechanically, and/or manually, and/or automatically, and/or electrically the polarization direction so that it is parallel to the c-axis 204c of the nonlinear optical crystal 214. This polarization correction device, i.e., the beam property control device 502 (see FIG. 8), is optional; it is required to be inserted in a mounting only if the distorted polarization of the pump beam 102 exiting the nonlinear optical crystal 214 causes trouble in the terahertz parametric generator 200, so that the output power of the terahertz parametric generator 200 does not increase, where trouble in the terahertz parametric generator 200 is caused if the phase and the polarization of the pump beam 506 (recycled) are very different from those of the pump beam 201 (fresh).

Figure 6A:
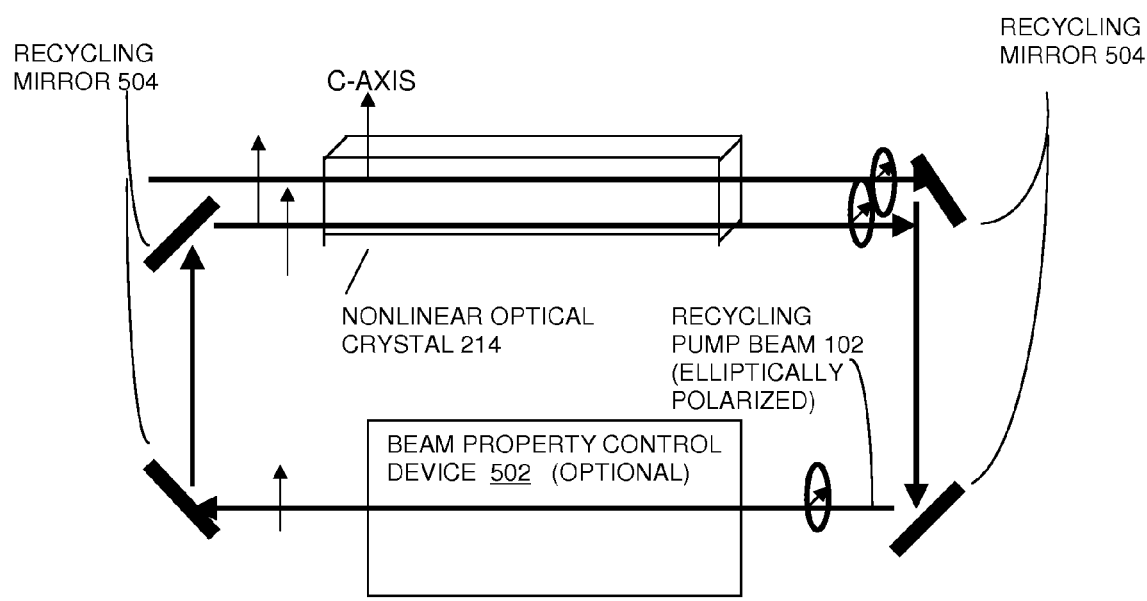
FIG. 6A illustrates a technique for recycling of the pump beam 102 in a parallel beam configuration.

FIG. 6A illustrates a scheme for recycling the pump beam 102 in the parallel beam configuration. The pump beam 102 having been recycled may be slightly separated from the pump beam 102 that is fresh, i.e., where "fresh" is descriptive of the pump beam 102 being freshly pumped by the Nd:YAG pulsed laser 202.

Figure 6B:
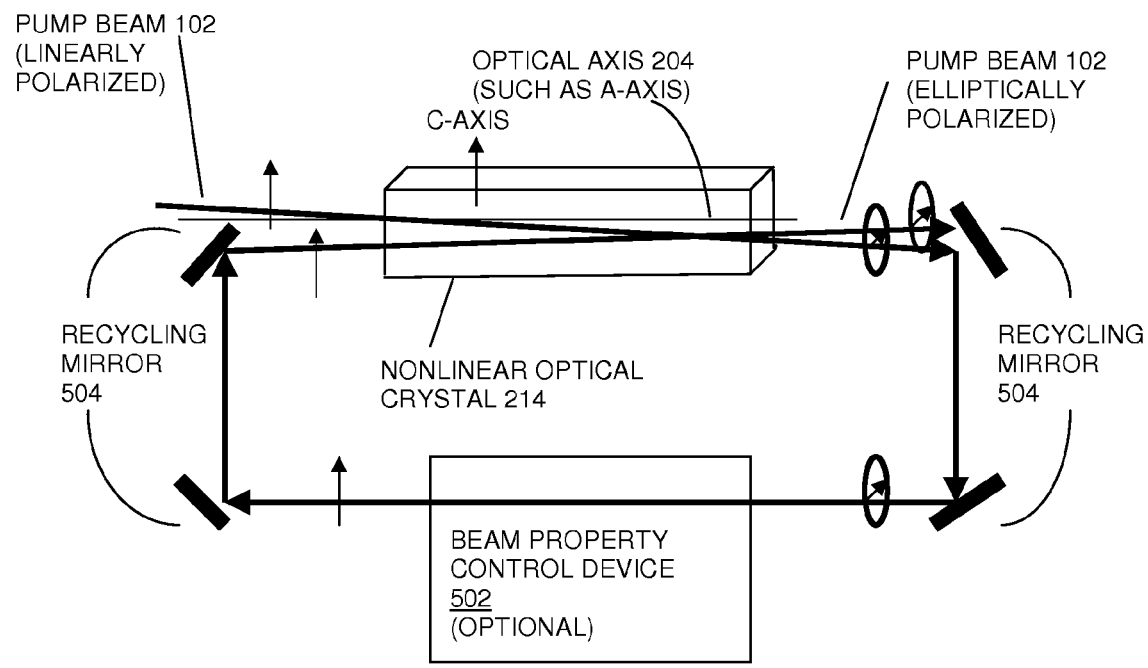
FIG. 6B illustrates a technique for recycling of the pump beam 102 in a crossed-beam configuration.

FIG. 6B illustrates a scheme for the recycling of the pump beam 102 in the crossed-beam configuration. The pump beam 102 having been recycled (such as second pump beam(s) 506), overlaps with the pump beam 102 that is fresh (i.e., that is freshly pumped by the Nd:YAG pulsed laser 202), when the pump beam 102 that is recycled (i.e., combined with second pump beam(s) 506) enters the nonlinear optical crystal 214. According to exemplary embodiments, a terahertz-beam 208 with a much larger output can be achieved, when the pump beam 102 that is recycled overlaps the pump beam 102 that is fresh, i.e., the first pump beam. If the pump beam 102 is recycled (i.e., combined with second pump beam(s) 506) only once (rather than repetitively recycled more than one time) it may be expected that the terahertz output power would double. However, exemplary embodiments provide terahertz output power increases much more than double (i.e., approaching an order of magnitude of power increase), when the pump beam 102 that is fresh and the pump beam 102 that is recycled overlap with each other. Thus, this configuration produces an amplification effect, when the pump beam 102 that is fresh and the pump beam 102 that is recycled overlap. Additionally, according to exemplary embodiments, the strength of the idler beam 104 increases dramatically (i.e., more than 8 times-almost an order of magnitude increase). Thus, if the pump beam 102 that is recycled is repetitively recycled one or more times, then the idler beam 104 becomes very strong, and contributes the terahertz output power increasing to more than about one order of magnitude.

Figure 7:
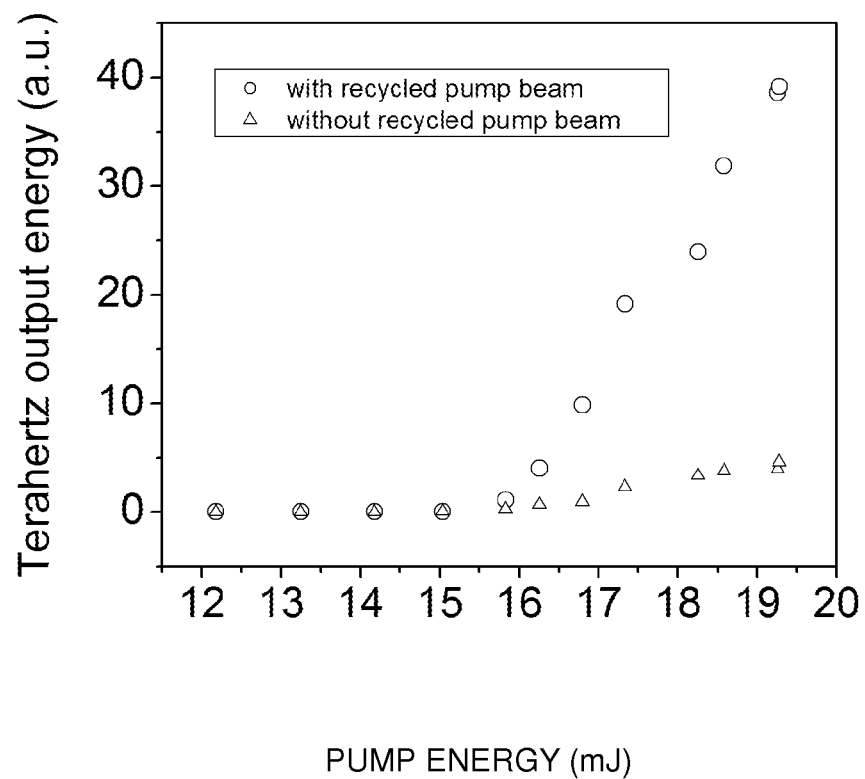
FIG. 7 illustrates a graph showing an enhancement of the terahertz beam power with recycling of the pump beam 102.

Referring to FIG. 7, and according to exemplary embodiments, FIG. 7 is a graph showing experimental results of an enhancement of the terahertz beam power with and without recycled pump beams.

As mentioned above and referring to FIG. 5A, the beam quality of the pump beam 102 that is recycled, greatly affects the terahertz output power. If the beam quality of the pump beam 102 that is recycled is poor, then the pump beam 102 which is recycled can decrease the terahertz output. The quality of the pump beam 102 that is recycled positively enhances the terahertz output achieved when the following configuration requirements are observed (NOTE: the pump beam 506 that is recycled is considered to be a second pump beam; and the pump beam 102 that is freshly pumped is considered to be a first pump beam):

(1) The polarization of the second pump beam 506, which is recycled must be aligned to be parallel to the polarization of the pump beam 102 that is freshly pumped by the Nd:YAG pulsed laser 202;

(2) The second pump beam 506 that is recycled, which can be expressed as;

$$P_R \exp(-i\omega t - \phi),$$

should be in phase with the pump beam that is freshly pumped, i.e.:

$$P \exp(-i\omega t); \text{thus}$$

the phase factor $\phi$ must satisfy the condition:

$$\phi = 2n\pi \text{ where } n \text{ is an integer; and} \quad (6)$$

(3) The second pump beam 506 that is recycled should be well-collimated, and should be in the TEM00 mode, where the TEM00 mode is the lowest order, or fundamental transverse mode of the laser resonator and has the same form as a Gaussian beam.

Thus, according to exemplary embodiments, additional enhancements of the terahertz output can be achieved with the beam property control device 502, which controls the quality of the THz beam 208; however, the beam property control device 502 is optional and the additional enhancements of the terahertz output have been achieved even without using the beam property control device 502; according to exemplary embodiments, the second pump beam 506 that is recycled often satisfies the above three conditions without the help of the beam-property control device 502. However, to enforce the above conditions it is desirable to insert the beam-property control device 502 in the path of the second pump beam 506 that is recycled, as shown in FIG. 5A, FIG. 5B, FIG. 6A and FIG. 6B.

Figure 8:
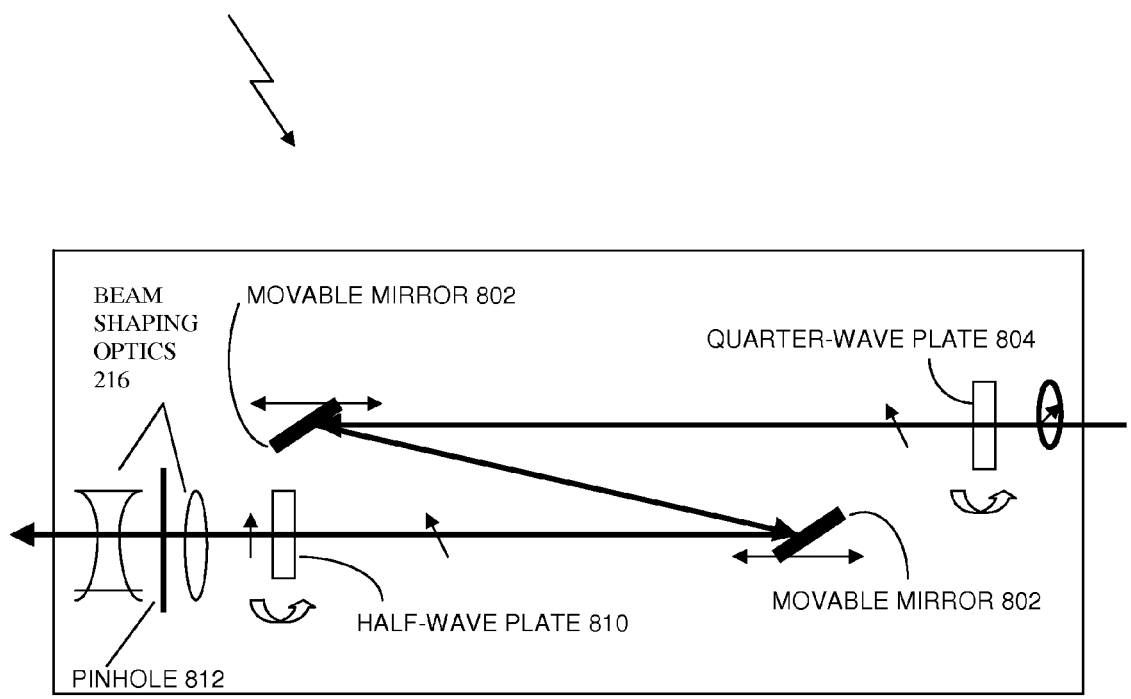
FIG. 8 illustrates a beam property quality control device 502, which readjusts the polarization and the phase of the recycling pump beam.

FIG. 8 shows a schematic diagram of the beam-property control device 502.

Referring to FIG. 8, in exemplary embodiments, the basic function of the beam-property control device 502 is to adjust the second pump beam 506 that has been recycled, so that the second pump beam 506 that is recycled is in the TEM00 mode with a proper phase delay and properly aligned polarization (i.e., linear polarization that is parallel to the c-axis 204c of the nonlinear optical crystal 214). The rotatable quarter-wave plate 804 changes the second pump beam 506 that is recycled and which is elliptically polarized to a second pump beam 506 that is recycled and which is linearly polarized, in a manner corresponding to the pump beam 102 which is freshly pumped and is linearly polarized. The two movable mirror(s) 802 adjust the time delay in order to achieve the correct phase $\phi$. The half-wave plate 810 is also rotatable, and it is used to change the polarization direction of the second pump beam 506 that is recycled, so that the polarization of the second pump beam 506 that is recycled will be parallel to the c-axis 204c of the nonlinear optical crystal 214. The beam shaping optics 216 consists of lenses and a pinhole 812 in order to conform the second pump beam 506 that is recycled to the TEM00 mode pattern.

Referring to FIG. 6A and FIG. 6B, and according to exemplary embodiments, the pump beam 102 recycling method is a new feature. In accordance with exemplary embodiments, the pump beam 102 recycling method has the following advantages: (1) A drastic reduction of the pump beam 102 wasted energy is achieved by recycling the pump beam 102 that would otherwise be dumped in the beam dump 210; (2) A high repetition pump beam rate is achieved by the pump beam recycling method forming the second pump beam 506 that is recycled (the repetition rate can be more than 1 GHz, whereas the repetition rate of conventional systems is typically below 100 Hz); (3) A low threshold energy of pump beam 102 is achieved for terahertz beam generation; (4) A high conversion efficiency is achieved over a long time period (see Manley-Rowe relationship; also see FIG. 7); and (5) amplification of the terahertz beam 208 is achieved. Based upon all these advantages, a TPO with the pump beam 102 repetitively recycled produces a terahertz beam 208 that is stable and exhibits high power (i.e., with power $\geq 1$ mW) over a long time period (see FIG. 5A). The recycling method is accomplished by implementing at least four recycling mirror(s) 504 (also see, FIG. 5A).

According to exemplary embodiments, in regard to either a TPG or TPO, the maximum power of a pump beam 102 should be kept below a threshold power to prevent damage to the nonlinear optical crystal 214, such as surface laser ablation. A laser beam with a power density larger than $1.2 \times 10^8$ W/cm$^2$, even with a single laser pulse can cause laser ablation to take place, which permanently damages the surface of the nonlinear optical crystal 214, such as a nonlinear optical crystal 214 composed of LiNbO$_3$. With a power density of about $1.13 \times 10^8$ W/cm$^2$, and with a single shot of the Nd:YAG pulsed laser 202, there is no visible damage to the nonlinear optical crystal 214. However, repetitive laser pulses transmitted from the Nd:YAG pulsed laser 202, at a frequency of 20 Hz for several minutes heavily damage the surface of the nonlinear optical crystal 214, due to laser ablation. After laser ablation damage occurs, the power of the THz beam 208 is gradually decreased, as the pump beam 102 is increasingly scattered by the damaged crystal surface. Eventually, most of the pump beam 102 photons cannot traverse the nonlinear optical crystal and are unable to produce terahertz photons.

Further, according to exemplary embodiments, in regard to either a pulsed TPG or TPO, the frequency down conversion from the pump photons to terahertz photons follows the Manley-Rowe relation:

$$\frac{P_1}{\omega_1} = \frac{P_2}{\omega_2} = -\frac{P_3}{\omega_3}, \quad (7),$$

where $P_1$, $P_2$ and $P_3$ denote the power of pump beam, idler beam and terahertz beam. The Manley-Rowe relation indicates a substantial power loss through the frequency down conversion. According to exemplary embodiments, if a pump beam 102 peak power is $P_1 = 1.46$ MW (6), and $$\omega_1 = 281.95 \text{ THz (i.e. } \lambda = 1064 \text{ nm)}, \quad (8), \text{ then}$$

the maximum peak-power of the terahertz beam at 1 THz cannot exceed $P_3 \approx 5.18$ kW. Actual conversion efficiency of either a TPO or a TPG is typically lower than 1%, which means that the peak-power ($P_3$) of terahertz beam is lower than 51.8 W (i.e. $P_3 \leq 51.8$ W).

The averaged power of a terahertz beam 208 can be calculated as:

$$P_{3ave} = R_{rep} \times P_3 \times W_{pulse}, \quad (9)$$

where $R_{rep}$ is the repetition rate of the pump beam 102 pulses and $W_{pulse}$ is the pulse width of the pump beam 102. Using experimental parameters, such as $R_{rep}=50$ Hz and $W_{pulse}=24$ nanoseconds, the averaged terahertz power from a conventional TPO can be at best 62 µW. This averaged terahertz power is too weak for a practical terahertz applications, such as remote detection of explosives or remote detection of biochemical agents.

For a practical terahertz application it is desirable to raise the averaged terahertz power to be more than 1 mW.

Figure 1:
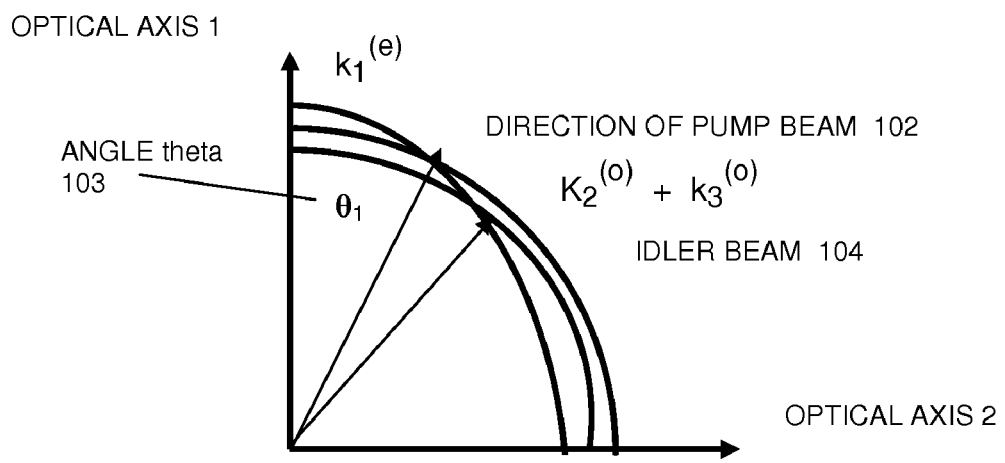
FIG. 1 illustrates Type I phase matching, in which the birefringence of a nonlinear optical crystal 214 is used to compensate for the dispersion in the crystalline material.
Figure 2:
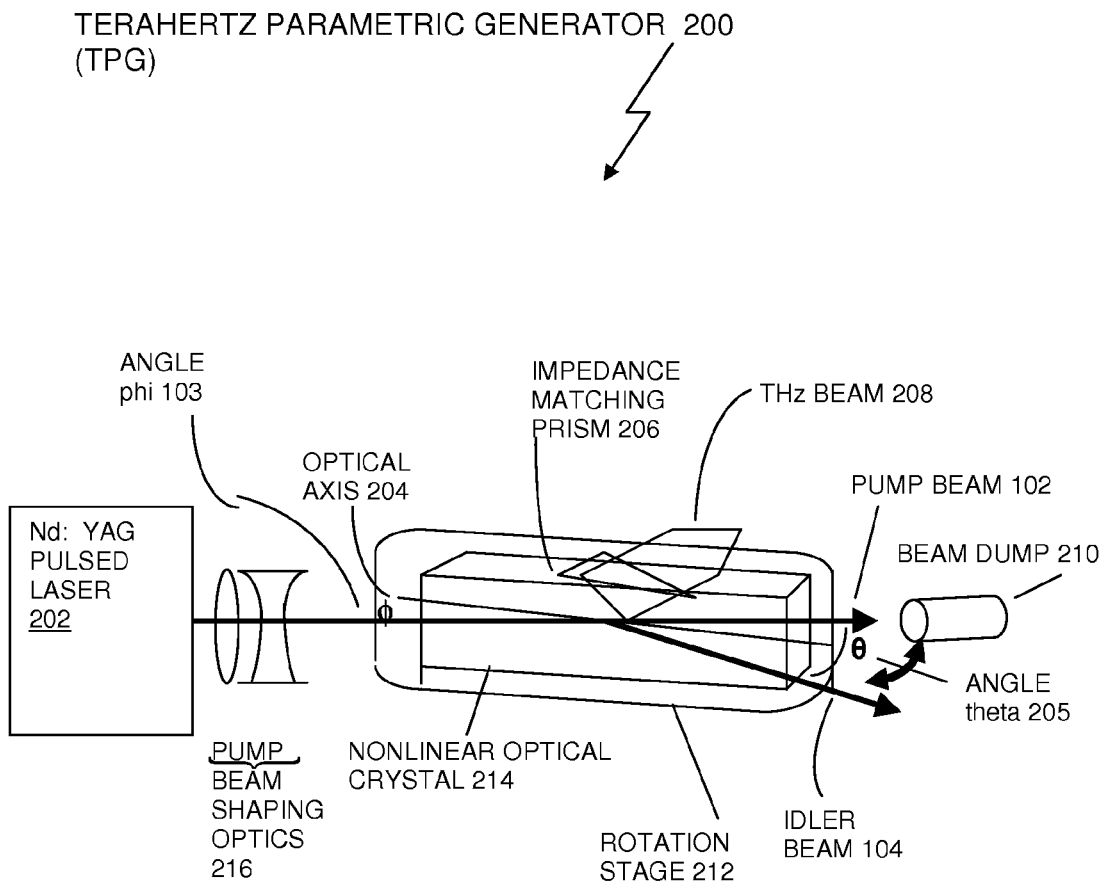
FIG. 2 illustrates a terahertz parametric generator 200 (TPG).
Figure 3:
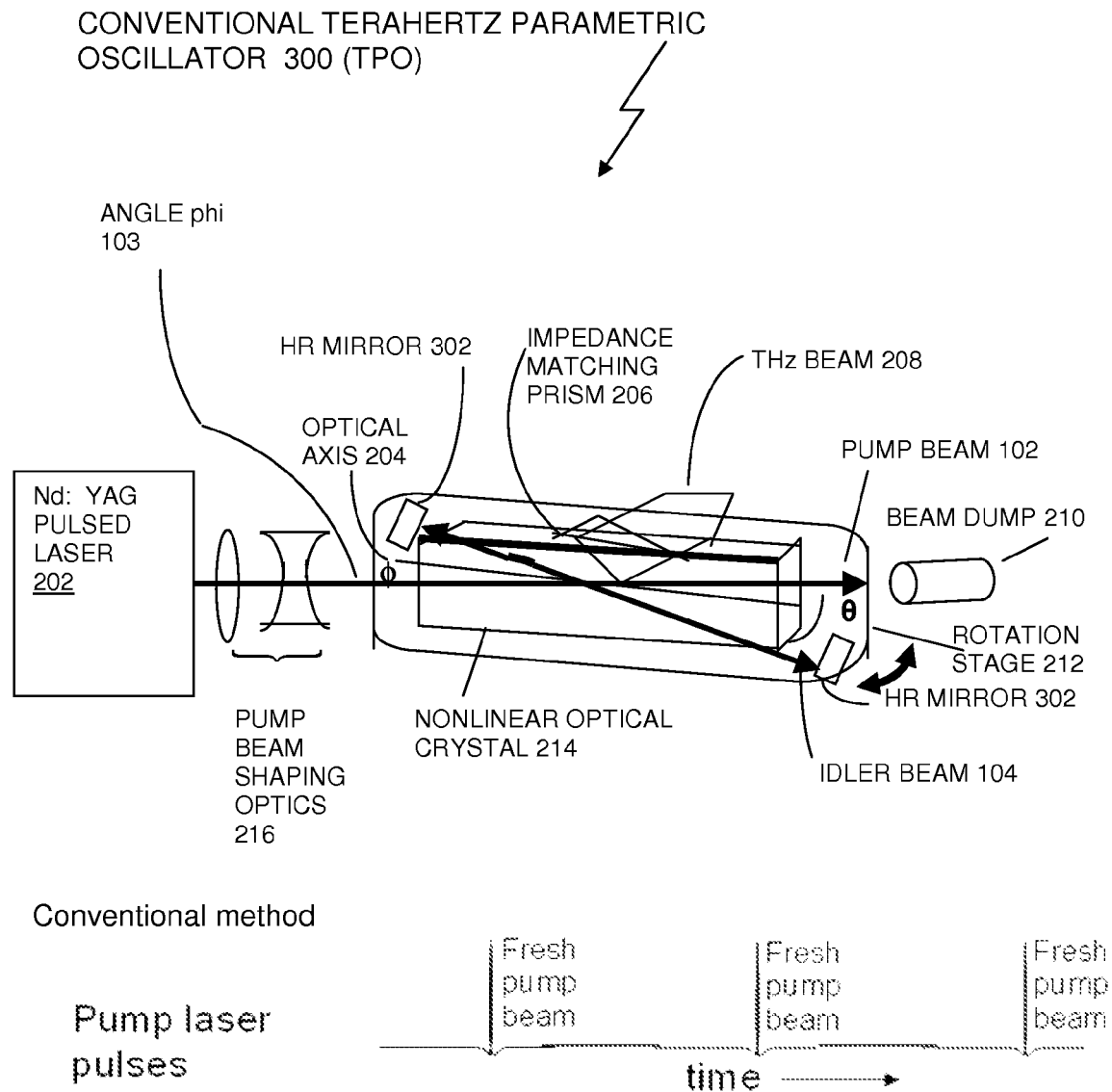
FIG. 3A illustrates a terahertz parametric oscillator 300 (TPO).
FIG. 3B illustrates a timing diagram of pump laser pulses showing the occurrences of the introduction of fresh pump beams, associated with the terahertz parametric oscillator 300 (TPO) illustrated in FIG. 3A.

In order to increase the averaged terahertz power exemplary embodiments of a terahertz parametric oscillator shown in FIG. 5A, FIG. 6A and FIG. 6B recycle the pump beam 102 exiting from the nonlinear optical crystal 214 (also see FIG. 5B); otherwise the pump beam 102 would be dumped into a beam dump, such as the beam dump 210 (see FIG. 2 and/or FIG. 3A).

Also, by recycling the pump beam 102 the rate of repetition of the pump beam 102 pulses is increased dramatically (from 50 Hz to 1 GHz). This increased repetition rate further enhances the terahertz beam 208 generation efficiency.

The second pump beam 506 that is recycled interacts with the pump beam 102 that is freshly pumped constructively, so that the effective power of the pump beam 102 is increased. Since the terahertz beam power increases hyperbolically with the effective pump power: (i.e. $P_3 \propto (\cosh E_1^{eff})^2$), the output power of terahertz beam 208 rapidly increases when the pump beam 102 is recycled (see FIG. 7). According to exemplary embodiments, $E_1^{eff}$ is an optical field strength of the effective pump beam $P_1^{eff}$, which is given as $(E_1^{eff})^2 = P_1^{eff}$.

According to exemplary embodiments, because of the constructive interaction between the pump beam 102 freshly pumped and the second pump beam 506 recycled, the threshold energy of pump beam 102 required to generate a terahertz beam becomes lower in comparison to the threshold energy of a conventional TPO. Referring to FIG. 7, and according to exemplary embodiments, in regard to a TPO with the pump beam 102 recycled, the threshold energy of the pump beam 102 is around 15 milli-Joule (mJ); and the threshold energy is around 17 mJ for a TPO without the pump beam 102 recycled. Thus, according to exemplary embodiments, a TPO can be constructed with a weak Nd:YAG pulsed laser 202, which is less expensive to implement, as a source for a terahertz beam 208. Also a pump beam 102 which is weaker is also safer for the nonlinear optical crystal 214, as it will not result in damage to the nonlinear optical crystal 214. Therefore, a TPO with the pump beam 102 recycled will be more stable and reliable, while it can produce a terahertz beam 208 having a high power output, exceeding 1 mW.

Thus, according to exemplary embodiments, the power of the terahertz beam 208 increases hyperbolically with the pump beam 102 effective power; and in turn, the output power of terahertz beam 208 increases dramatically, when the second pump beam 506 recycled combines with the power on the pump beam 102 freshly pumped (see FIG. 7). Using the second pump beam 506 recycled, the terahertz output energy increases dramatically, i.e., this terahertz output energy increases more than one order of magnitude at $P_1=19.3$ mJ.

According to exemplary embodiments, a lithium niobate ($LiNbO_3$) crystal or a doped lithium niobate crystal ($LiNbO_3$:MgO 5%), i.e., doped with 5% magnesium oxide (MgO) are used as the nonlinear optical crystal 214; however, any other species of a nonlinear optical crystal 214, such as GaSe, can be used in place of $LiNbO_3$; and according to exemplary embodiments, the terahertz beam 208 output increases by nearly one order of magnitude for a TPO with the pump beam 102 recycled. While the type of crystal greatly affects the overall terahertz output (e.g., $LiNbO_3$:MgO 5% or $LiNbO_3$ with a slight lattice imperfection produces a stronger terahertz beam), in exemplary embodiments, the enhancement of the terahertz output can be achieved by recycling the pump beam 102, regardless of the type of crystal used.

However, the output of the optical parametric THz beam generation source is dependent on the type of material selected as the nonlinear optical crystal 214.

In exemplary embodiments, two or three different crystals undoped were fabricated and post-treated slightly differently. Due to these different treatments, one of the crystals exhibiting strong nonlinearity (i.e., stronger than the other crystals) produced a idler beam 104 that is stronger and thus results in a THz beam 208 which is orders of magnitude stronger than conventionally produced THz beams.

The foregoing description of the specific embodiments will so fully reveal the general nature of the invention that others can, by applying knowledge within the ordinary skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teachings, guidance, and claims presented herein.

What is claimed is:

1. A terahertz parametric beam source, having high conversion efficiency and a high output power beam produced at terahertz frequencies, the terahertz parametric beam source comprising:
    a pulsed laser stage, which includes a first crystal used as a lasing medium generating a first pump beam;
    a beam shaping optics stage cooperatively coupled to the pulsed laser stage for shaping the first pump beam;
    a nonlinear optical crystal stage having a second crystal, wherein the second crystal is a nonlinear optical crystal having an optical axis, cooperatively coupled to the pulsed laser stage by the beam shaping optics stage, wherein the nonlinear optical crystal stage includes at least four recycling mirrors in a configuration which produces a second pump beam by recycling the first pump beam, and causing the second pump beam to overlap the first pump beam, causing amplification of the output power beam produced at terahertz frequencies, wherein the nonlinear optical crystal produces an idler beam and generates the output power beam produced at terahertz frequencies, and wherein the terahertz parametric beam source is tunable and portable.

2. The terahertz parametric beam source according to claim 1, further including a rotation stage and a mounting, upon which the nonlinear optical crystal is mounted and rotated, changing the frequency of the idler beam, and enabling frequency tuning of the high output power beam over terahertz frequencies.

3. The terahertz parametric beam source according to claim 1, further including a beam property control device, for controlling polarization of the second pump beam.

4. The terahertz parametric beam source according to claim 1, wherein the nonlinear optical crystal is at least one of a lithium niobate crystal, and a lithium niobate crystal doped with magnesium oxide, and a gallium selenide crystal.

5. The terahertz parametric beam source according to claim 1, wherein an angle theta is formed between the first pump beam and the idler beam, where the first pump beam exits the nonlinear optical crystal.

6. The terahertz parametric beam source according to claim 1, wherein an angle phi is formed between the first pump beam and the optical axis of the nonlinear optical crystal, and wherein terahertz frequencies are tuned by changing the angle phi between the first pump beam and the optical axis of the nonlinear optical crystal where the first pump beam enters the nonlinear optical crystal, and wherein the idler beam is tuned over a wavelength range from about 1064.4 nm to about 1073.5 nm, wherein the wavelength range corresponds to a frequency range of ($\omega 2$) of about 279.46 terahertz to ($\omega 2$) of about 281.85 terahertz, as the angle phi is changed, wherein a frequency difference between $\omega 1$ and $\omega 2$ is $\omega 3 = \omega 1 - \omega 2$ which corresponds to a frequency range from about 0.1 to about 2.5 terahertz, wherein $\omega 1$ is a frequency of about 281.95 terahertz, and wherein the first pump beam and the second pump beam have the same frequency $\omega 1$.

7. The terahertz parametric beam source according to claim 1, further including a group of at least two high reflectivity mirrors configured to cause the idler beam to resonate between the group of at least two high reflectivity mirrors causing an increase in amplitude of the idler beam.

8. A method of generating a terahertz parametric beam, having conversion efficiency approaching a maximum value defined by Manley-Rowe relations and an output power produced at terahertz frequencies, the method comprising:

transmitting a first pump beam from a pulsed laser source through a pump beam shaping optics stage to a nonlinear optical crystal stage having a nonlinear optical crystal, along an optical axis of the nonlinear optical crystal, wherein the first pump beam having a first polarization which is linearly polarized, and wherein the nonlinear optical crystal stage is mounted on a rotation stage;

producing an idler beam and a second pump beam in the nonlinear optical crystal stage, wherein the second pump beam has a second polarization which is elliptically polarized;

resonating the idler beam between high reflectivity mirrors in the nonlinear optical crystal stage;

tuning the idler beam over a wavelength range of from about 1064.4 nm to about 1073.5 nm, by mechanically rotating the rotation stage;

recycling one or more times the second pump beam and overlapping the second pump beam with the first pump beam; and producing in the nonlinear optical crystal an amplified terahertz beam having a frequency range from about 0.1 to about 2.5 THz, resulting in conversion efficiency approaching Manley-Rowe relations by adding the one or more second pump beam having an increased repetition rate to the first pump beam, wherein both the one or more second pump beam and the first pump beam produce an increased effective pump beam power by constructive interaction between one or more of the first pump beam and one or more of the second pump beam, wherein the first pump beam is a fresh pump beam and wherein the second pump beam is a recycled pump beam which is recycled one or more times through the nonlinear optical crystal.

9. The method according to claim 8, further comprising aligning polarization of the second pump beam with that of the first pump beam using a beam property control device.

10. The method according to claim 9, wherein using the beam property control device causes the second pump beam to be transmitted in a TEM00 mode and causes the second pump beam to be in phase with the first pump beam.

11. The terahertz parametric beam source according to claim 1, wherein overlap is caused when the first pump beam is in one of a parallel configuration and a crossed-beam configuration with the second pump beam.

12. The terahertz parametric beam source according to claim 11, wherein when the first pump beam is in the parallel configuration with the second pump beam and when the first pump beam is separated from the second pump beam, the overlap is one of reduced and removed.

13. The method according to claim 8, wherein overlapping is caused when the first pump beam is in one of a parallel configuration and a crossed-beam configuration with the second pump beam.

14. The method according to claim 13, wherein when the first pump beam is in the parallel configuration with the second pump beam and when the first pump beam is separated from the second pump beam, the overlap is one of reduced and removed.

* * * * *